US010554416B1

(12) United States Patent
Yavuz

(10) Patent No.: US 10,554,416 B1
(45) Date of Patent: Feb. 4, 2020

(54) SYSTEM AND METHOD OF AUDIT LOG PROTECTION

(71) Applicant: Attila Altay Yavuz, Tampa, FL (US)

(72) Inventor: Attila Altay Yavuz, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/389,519

(22) Filed: Apr. 19, 2019

Related U.S. Application Data

(62) Division of application No. 16/207,127, filed on Dec. 1, 2018.

(51) Int. Cl.
*H04L 9/32* (2006.01)
*H04L 9/08* (2006.01)

(52) U.S. Cl.
CPC .......... *H04L 9/3242* (2013.01); *H04L 9/0891* (2013.01); *H04L 2209/26* (2013.01)

(58) Field of Classification Search
CPC .............................. H04L 9/0891; H04L 9/3242
USPC ........................................................ 713/168
See application file for complete search history.

(56) References Cited

U.S. PATENT DOCUMENTS

| 7,543,333 B2* | 6/2009 | Pandit | G06F 21/31 709/224 |
|---|---|---|---|
| 8,700,899 B1 | 4/2014 | Juels | |
| 9,852,300 B2* | 12/2017 | Lindteigen | G06F 21/602 |
| 2005/0234909 A1 | 10/2005 | Bade et al. | |
| 2007/0028307 A1* | 2/2007 | Murison | H04L 43/04 726/27 |
| 2014/0075201 A1* | 3/2014 | Hiwatari | H04L 9/3247 713/176 |

OTHER PUBLICATIONS

F. Ning, et al., Efficient tamper-evident logging of distributed systems via concurrent authenticated tree., 2017 IEEE 36th International Performance Computing and Communications Conference (IPCCC), San Diego, CA, 2017, pp. 1-9. doi: 10.1109/PCCC.2017.8280476.
D. Derler, et al., Post-Quantum Zero-Knowledge Proofs for Accumulators with Applications to Ring Signatures from Symmetric-Key Primitives., first published 2017 in PQCrypto. PQCrypto 2018, LNCS 10786, pp. 419-440, 2018.

(Continued)

*Primary Examiner* — Jacob Lipman
(74) *Attorney, Agent, or Firm* — Meunier Carlin & Curfman LLC

(57) ABSTRACT

A computer data security system, useful in protecting audit logs, includes symmetric key based techniques, requires only a small-constant number of cryptographic hash operations at the signer side sending a prospective audit log or other computer record data to a primary repository to achieve forward-secure and append-only authentication. The verification is performed by independent parties sharing parts of the symmetric key, wherein the presence of single honest party among all verifier parties ensures a conditional non-repudiation. It also ensures that an active adversary cannot generate authentication tags on behalf of the signer, unless it compromises all verification parties.

11 Claims, 2 Drawing Sheets

(56) References Cited

OTHER PUBLICATIONS

M. Bellare, B. Yee, Forward-Security in Private-Key Cryptography. In: Joye M. (eds) Topics in Cryptology—CT-RSA 2003. CT-RSA 2003. Lecture Notes in Computer Science, vol. 2612. Springer, Berlin, Heidelberg, 24 pages.
R. Accorsi, A secure log architecture to support remote auditing. Mathematical and Computer Modelling vol. 57, Issues 7-8, Apr. 2013, pp. 1578-1591.
M. Abdalla and L. Reyzin. A new forward-secure digital signature scheme. In Advances in Crpytology (ASIACRYPT '00), pp. 116-129. Springer-Verlag, 2000.
R. Accorsi. Log data as digital evidence: What secure logging protocols have to offer? In International Computer Software and Applications Conference (COMPSAC '09), pp. 398-403, 2009.
M. Bellare and P. Rogaway. Introduction to modern cryptography. In UCSD CSE Course, p. 207. 1st edition, 2005. http://www.cs.ucsd.edu/~mihir/cse207/classnotes.html.
Piotr Berman, Marek Karpinski, and Yakov Nekrich. Optimal trade-o_ for merkle tree traversal. Theoretical Compututer Science, 372(1):26-36, Mar. 2007.
Daniel J. Bernstein, Daira Hopwood, Andreas Hillsing, Tanja Lange, Ruben Niederhagen, Louiza Papachristodoulou, Michael Schneider, Peter Schwabe, and Zooko Wilcox-O'Hearn. Sphincs: Practical stateless hash-based signatures. In Elisabeth Oswald and Marc Fischlin, editors, Advances in Cryptology—EUROCRYPT 2015, pp. 368-397. Springer Berlin Heidelberg, 2015.
Dan Boneh, Ben Lynn, and Hovav Shacham. Short signatures from the weil pairing. In Colin Boyd, editor, Advances in Cryptology—ASIACRYPT 2001, pp. 514-532. Springer Berlin Heidelberg, 2001.
Ferdinand Brasser, Urs Müller, Alexandra Dmitrienko, Kari Kostiainen, Srdjan Capkun, and Ahmad-Reza Sadeghi. Software Grand Exposure: SGX Cache Attacks Are Practical, 2017, 12 pages.
Jo Van Buick, Nico Weichbrodt, R. Kapitza, Frank Piessens, and Raoul Strackx. Telling Your Secrets without Page Faults: Stealthy Page Table-Based Attacks on Enclaved Execution. In USENIX Security, 2017, 17 pages.
C. N. Chong and Z. Peng. Secure audit logging with tamper-resistant hardware. In Proceedings of the 18th IFIP International Information Security Conference, pp. 73-84. Kluwer Academic Publishers, 2003.
E. Cronin, S. Jamin, T. Malkin, and P. McDaniel. On the performance, feasibility, and use of forward-secure signatures. In Proceedings of the 10th ACM Conference on Computer and Communications Security (CCS '03), pp. 131-144. ACM, 2003.
S. Crosby and D. S. Wallach. Efficient data structures for tamper evident logging. In Proceedings of the 18th conference on USENIX Security Symposium, Aug. 2009, 17 pages.
D. Davis, F. Monrose, and M. Reiter. Time-scoped searching of encrypted audit logs. In Proc. of the 6th International Conference on Information and Communications Security (ICICS '04), pp. 532-545, 2004.
Christopher W Fletcher, Marten van Dijk, and Srinivas Devadas. A secure processor architecture for encrypted computation on untrusted programs. In Proceedings of the seventh ACM workshop on Scalable trusted computing, pp. 3-8. ACM, 2012.

J. E. Holt. Logcrypt: Forward security and public verification for secure audit logs. In Proc. of the 4th Australasian workshops on Grid computing and e-research (ACSW '06), pp. 203-211, 2006.
Intel Corporation. Intel Software Guard Extensions Programming Reference (rev2), Oct. 2014. 329298-002US, 186 pages.
M. Jakobsson. Fractal hash sequence representation and traversal. In Proceedings of the 2002 IEEE International Symposium on Information Theory (ISIT '02), pp. 437-444. IEEE, 2002.
Jaehyuk Lee, Jinsoo Jang, Yeongjin Jang, Nohyun Kwak, Yeseul Choi, Changho Choi, Taesoo Kim, Marcus Peinado, and Brent B Kang. Hacking in darkness: Return-oriented programming against secure enclaves. In USENIX Security, pp. 523-539, 2017.
Sangho Lee, Ming-Wei Shih, Prasun Gera, Taesoo Kim, Hyesoon Kim, and Marcus Peinado. Inferring Fine-grained Control Flow Inside SGX Enclaves with Branch Shadowing. In USENIX Security, 2017.
D. Ma. Practical forward secure sequential aggregate signatures. In Proceedings of the 3rd ACM symposium on Information, Computer and Communications Security (ASIACCS '08), pp. 341-352, NY, USA, 2008. ACM.
D. Ma and G. Tsudik. Forward-secure sequential aggregate authentication. In Proceedings of the 28th IEEE Symposium on Security and Privacy (S&P '07), pp. 86-91, May 2007.
D. Ma and G. Tsudik. A new approach to secure logging. In Proc. of the 22nd Annual IFIP WG 11.3 Working Conference on Data and Applications Security (DBSEC '08), pp. 48-63, 2008.
D. Ma and G. Tsudik. A new approach to secure logging. ACM Transaction on Storage (TOS), 5(1):1-21, 2009.
Frank McKeen, Ilya Alexandrovich, Ittai Anati, Dror Caspi, Simon Johnson, Rebekah Leslie-Hurd, and Carlos Rozas. Intel® software guard extensions (intel® sgx) support for dynamic memory management inside an enclave. In Proceedings of the Hardware and Architectural Support for Security and Privacy 2016, 9 pages. ACM, 2016.
R. Merkle. Protocols for public key cryptosystems. In Proceedings of the IEEE Symposium on Research in Security and Privacy, 14 pages, Apr. 1980.
B. Schneier and J. Kelsey. Cryptographic support for secure logs on untrusted machines. In Proc. of the 7th conference on USENIX Security Symposium. USENIX Association, 1998, 11 pages.
B. Schneier and J. Kelsey. Secure audit logs to support computer forensics. ACM Transaction on Information System Security, 2(2):159-176, 1999.
A. Shamir. How to share a secret. Communications of the ACM, 22(11):612-613, 1979.
Michael Szydlo. Merkle tree traversal in log space and time. In EUROCRYPT, pp. 541-554, 2004.
A. A. Yavuz and P. Ning. BAF: An efficient publicly verifiable secure audit logging scheme for distributed systems. In Proceedings of 25th Annual Computer Security Applications Conference (ACSAC '09), pp. 219-228, 2009.
A. A. Yavuz, Peng Ning, and Michael K. Reiter. BAF and FI-BAF: Efficient and publicly verifiable cryptographic schemes for secure logging in resource constrained systems. ACM Transaction on Information System Security, 15(2), 2012.
Office Action issued in co-pending U.S. Appl. No. 16/207,127, dated Jun. 25, 2019.

\* cited by examiner

SYSTEM AND METHOD OF AUDIT LOG PROTECTION

CROSS REFERENCE TO RELATED APPLICATIONS

This application is a divisional application of co-pending U.S. patent application Ser. No. 16/207,127, having a filing date of Dec. 1, 2018, which is incorporated herein in its entirety as if set forth fully below.

STATEMENT REGARDING FEDERALLY SPONSORED RESEARCH

None.

FIELD

The objective of this disclosure is to create new signer efficient cryptographic secure audit logging schemes that are compromise resilient, compact, post-quantum secure and yet achieve some nonrepudiation at the verifier side.

BACKGROUND

There are two main lines of cryptographic secure audit logging techniques.

Symmetric Cryptography based Primitives: In one line, several symmetric cryptography based secure audit logging techniques have been proposed [10, 12, 21, 27, 28]. These techniques mainly rely on Message Authentication Codes [4], hash chains [17], and Merkle-hash trees [26]. A common system architecture in these schemes is that, the signers (a.k.a, loggers) share a symmetric key with a trusted server, and uploads cryptographically secure audit logs to this trusted server. This server acts as an auditor, and verifies the authenticity of log entries by using the secret keys shared with the signers.

Many of these techniques are near-optimal efficient in terms computation and communication overhead due to their reliance on highly efficiency symmetric primitives. Some of these techniques also achieve signer-side (i.e., logger side) compromise resiliency via an implementation of forward-secure symmetric MACs with hash-chains [21]. Some of these techniques can also offer "all-or-nothing" features, wherein an adversary cannot selectively delete log entries from a log trail without being detected. Moreover, these techniques can achieve a post-quantum security, since they rely on symmetric primitives [1].

However, the symmetric cryptography based secure logging techniques have the following drawbacks: (i) They cannot achieve non-repudiation and public verifiability, since the verifier shares the same key with signer(s). That is, the verifier server can easily generate an authentication tag on behalf of any signer of its choice, since it has all the shared keys. Remark that, the lack of nonrepudiation is a significant drawback for many logging applications (e.g., financial and law audits) that need a dispute resolution mechanism.

Non-repudiation also alleviates the liability on verifiers, since they cannot be accused of creating fake authentication tags. (ii) The direct application of these techniques to secure logging might create vulnerabilities against active adversaries. Specifically, if the verifier is compromised by an active adversary (e.g., a malware or insider collusion), the security of all signers, with whom the verifier shares symmetric keys, are also compromised.

Public Key Cryptography based Primitives: In another line, public key cryptography based secure audit logging techniques have been proposed (e.g., [3, 13, 15, 22, 23, 32, 33]). These schemes are mainly based on digital signatures [4], which can guarantee public verifiability and non-repudiation properties. Moreover, since they rely on public keys for verification, they by default achieve verifier compromise resiliency and availability (anybody can verify the logs without relying on a trusted party). Many of these schemes (e.g., [20]) either adapt or create new forward-secure (e.g., [2]) and/or aggregate signature scheme [7] to offer signer-side compromise-resiliency and compactness. The signature aggregation offers an added benefit of append-only feature, wherein one can only add to a trail of audit logs, but cannot selectively delete from it without being detected.

Despite their merits, public key based secure logging techniques have the following drawbacks: (i) All these techniques rely on highly costly operations such as exponentiations, cryptographic pairing and elliptic curve scalar multiplications for per item to be signed or verified. While some schemes are efficient for either signer or verifier side, in generally they are several order of magnitude costlier than their symmetric key counterparts. (ii) Their key and signature sizes are significantly larger than that of symmetric cryptography based counterparts. (iii) All these alternatives rely on either factorization based or discrete logarithm based primitives, and therefore cannot offer a post-quantum security. A potential post-quantum secure variants of such forward-secure and/or aggregate schemes are potentially even more costly in terms of key and signature sizes than their traditional counterparts.

SUMMARY

A security system, method and computer program product provides for authenticating the updating of computer records and may include, in one embodiment, a network of member computers in data communication with each other, wherein at least a primary computer on the network tracks at least one entry into an audit log stored on the network. A processor is connected to the primary computer and further connected to computerized memory storing software configured to produce an authenticity flag for the at least one entry into the audit log. This occurs by distributing, among a group of verifying parties connected on the network, a plurality of discrete verification tasks for a single authentication code associated with a prospective entry into the audit log.

BRIEF DESCRIPTION OF THE DRAWINGS

The accompanying drawings, which are in and constitute a part of this specification, illustrate certain examples of the present disclosure and together with the description, serve to explain, without limitation, the principles of the disclosure. Like numbers represent the same element(s) throughout the figures.

DETAILED DESCRIPTION

Figure 1:
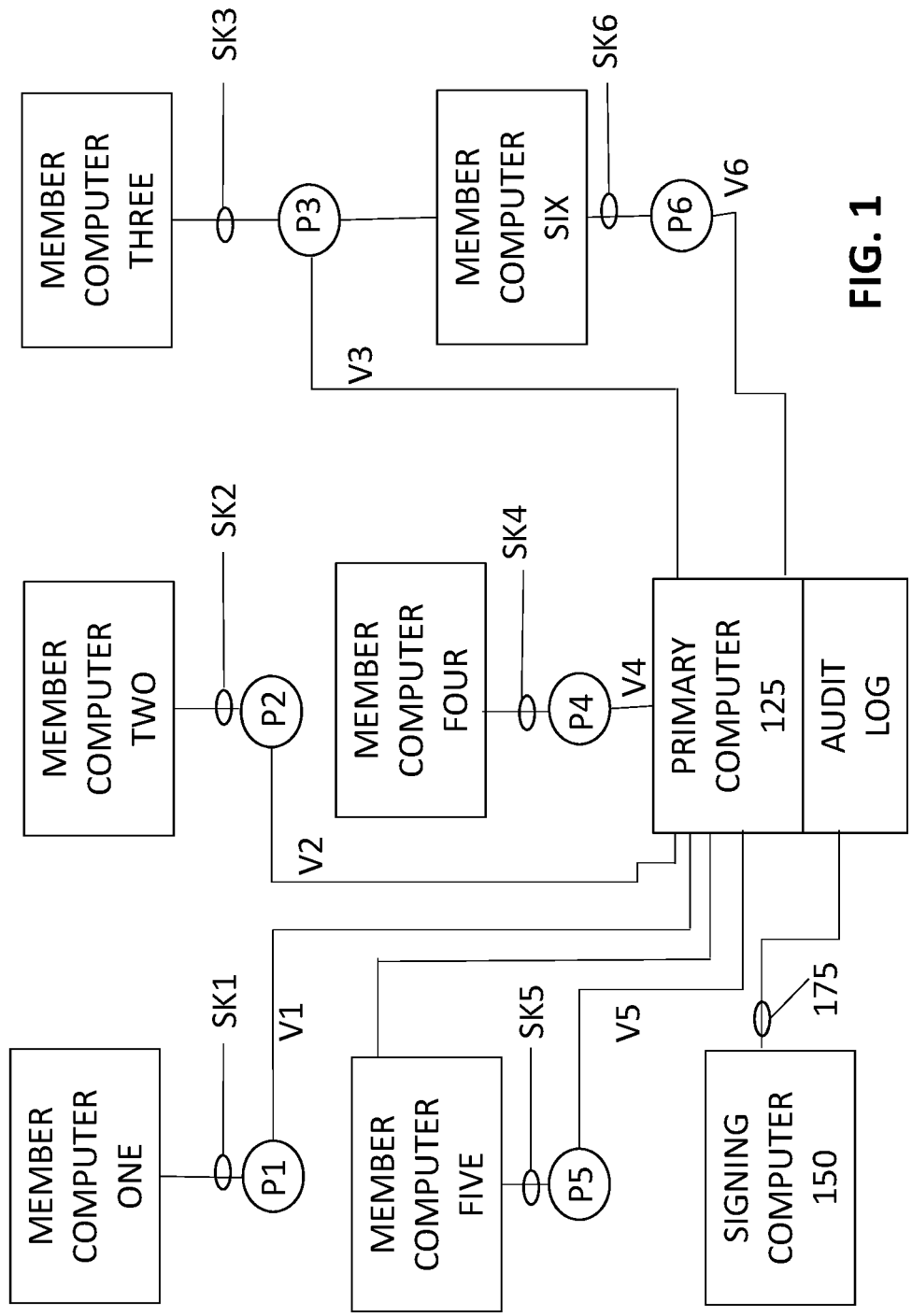
FIG. 1 is a schematic representation of a network of member computers and verifier parties as disclosed herein.

The following description of the disclosure is provided as an enabling teaching of the disclosure in its best, currently known embodiment(s). To this end, those skilled in the relevant art will recognize and appreciate that many changes can be made to the various embodiments of the embodiments described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Terminology

Unless defined otherwise, all technical and scientific terms used herein have the same meaning as commonly understood to one of ordinary skill in the art to which this disclosure belongs.

As used in the specification and claims, the singular form "a," "an," and "the" include plural references unless the context clearly dictates otherwise. For example, the term "an agent" includes a plurality of agents, including mixtures thereof.

As used herein, the terms "can," "may," "optionally," "can optionally," and "may optionally" are used interchangeably and are meant to include cases in which the condition occurs as well as cases in which the condition does not occur. Thus, for example, the statement that a formulation "may include an excipient" is meant to include cases in which the formulation includes an excipient as well as cases in which the formulation does not include an excipient.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Publications cited herein are hereby specifically by reference in their entireties and at least for the material for which they are cite Operators $\|$ and $|x|$ denote the concatenation and the bit length of variable x, respectively $S \xleftarrow{\$} S$ means variable x is randomly and uniformly selected from set S. For any integer L (or small letter "l"), $(x0, \ldots xL) \xleftarrow{\$} S$ means $(x0 \xleftarrow{\$} S, \ldots xL \xleftarrow{\$} S)$. $|S|$ means the cardinality of set S. $\{0,1\}^*$ is the set of binary strings of any finite length. The set of items $q_i$ for $i=0, \ldots, l-1$ is denoted by $\{q_i\}$ from $i=0$ to $L-1$. Log x means log base 2 of x. H denotes a cryptographic has function.

Key Evolving Strategies: Key-evolving techniques offer forward security (e.g., [11]), where the current keying material $sk^j$ is updated to $sk^{j+1}$ with a one-way function, and then $sk^j$ is deleted from the memory. For example, given key $k^j$, one can evolve (update) it as $k^{j+1} \leftarrow H(k^j)$, and then delete $k^j$. Even if $k^{j+1}$ is compromised, the adversary cannot compute $k^j$ from $k^{j+1}$ (recall that H is one way and collusion-free). Hence, any MAC computed with $k^j$ and keys before it cannot be forged by the attacker.

Merkle-Hash Tree (MHT): Merkle-hash Tree (MHT) [26] is a fundamental authentication tool that is used to construct digital signatures [6], enhance public key infrastructures and authenticate data sets with improved asymptotic overhead [5]. Given a set of n data items (M1 . . . Mn), the sender forms a hash-tree on top these items such that eventually all data items are represented by a root denoted as σ=MHT (M1 . . . Mn). Given the root is known to the verifier, MHT permits a transmission and processing of O(log 2(n)) items to authenticate a given data item in this set, as opposed to linear transmission O(n) of all data items. Refer to to [26, 31] for the details of MHT and its improved variants.

Shamir Secret Sharing (SSS): Shamir Secret Sharing (SSS) [29] is a basic threshold cryptography tool that permits an entity to share a data item with n parties such that only $1 < a \leq n$ out n parties can collectively recover this data item. SSS offers information theoretical security, which is the highest level of privacy that can be obtained in this setting. Refer to [29, 30] for the details of SSS. Audit logs are used to track important events and activities in a computer system. Due to their forensic and analytic values, audit logs are highly critical digital assets, and therefore must be protected from the attackers. Symmetric key cryptography based log protection mechanisms are highly efficient and can offer a postquantum security. However, they cannot achieve non-repudiation and compromise-resiliency at the verifier side. Public-key cryptography based log protection techniques achieve non-repudiation and public verifiability, but they are extremely costly and might not offer a post-quantum security. There is a need for an efficient post-quantum secure audit log protection scheme with compromise resiliency and non-repudiation.

This disclosure shows a new audit log protection scheme that is referred to as to as Compromise-Resilient, Append-only and Distributed Symmetric Audit Logging (CADSA). One concept discussed herein is to retain the efficiency and post-quantum security of symmetric key based techniques, while enabling compromise-resiliency and conditional non-repudiation via a distributed verification. CADSA requires only a small-constant number of cryptographic hash operations at the signer side to achieve forward-secure and append-only authentication. The verification is performed by independent parties sharing parts of the symmetric key, wherein the presence of single honest party among all ensures a conditional non-repudiation. It also ensures that an active adversary cannot generate authentication tags on behalf of the signer, unless it compromises all verification parties. CADSA retains the efficiency and post-quantum security of symmetric primitives both at the signer and verifier sides.

The forensic value of audit logs makes them an attractive target for attackers, who aim to erase the traces of their malicious activities recorded by logs. It is of vital importance to guarantee the trustworthiness of audit logs in computer and forensic systems. The use of cryptographic protection mechanisms is a foundational aspect to enhance the cyber-security of audit logs. Below, the limitations of state-of-the-art cryptographic secure audit logging techniques are discussed, and then describe the desirable properties of the proposed disclosure that can address some of these limitations.

Compromise-Resiliency at the Logger Side: CADSA achieves authenticity, integrity and confidentiality of audit logs while ensuring the forward security. That is, even if an active adversary compromises the logging device and cryptographic keys in it, the adversary cannot forge authentication tags generated before the attack occurs.

Compromise-Resiliency at the Verifier Side: CADSA guarantees each verifier possesses only a part of the signer's key. Unless an active adversary compromises all of n verifiers, a partially compromised set of verifiers do not help adversary to forge an authenticated tag.

Efficiency: It is necessary for cryptographic protection mechanism to incur minimal computational, communication and transmission overhead on loggers and log verifiers. It is particularly important to ensure the efficiency for logging devices, which might be a low-end device with resource-limitations (e.g., medical implantable, payment device, Internet of Things (IoT) sensor). In CADSA, the signer only needs small-constant number of MAC and cryptographic hash computations to generate a forward-secure and aggregate authentication tag for per log data item. Verifier parties also only need efficient symmetric key operations plus a communication overhead to collaboratively compute and compressed hash values.

Non-Repudiation: CADSA offers a conditional non-repudiation in the distributed setting, meaning that unless all the verifier parties collude, they cannot generate an authentication tag on behalf of the signer. As discussed before, this is not only a non-repudiation but also a verifier side compromise resiliency feature.

Long-Term Post-Qauntum Security: CADSA offers a postquantum security and conditional non-repudiation at the same time.

Broad Applicability: It is desirable for the proposed cryptographic mechanisms to be applicable to a broad range of applications beyond secure audit logging. CADSA can have a significant potential to be useful for a wide-range applications that require efficient cryptographic services with extended properties as described above.

One concept disclosed herein is to retain the communication/computation efficiency and post quantum security of MAC-based signature generation at the signer side, while realizing the MAC verification in a distributed setting, so that the system achieves a conditional non-repudiation and and compromise-resiliency at the verifiers side. At the set up phase (a.k.a. initialization phase), a Key Generation Center (KGC) generates n distinct symmetric keys For each signer ID from its master key "msk." The signer ID is provided with the full set of keys, and each key is shared with an independent verifier indexed to each member computer.

At the log generation phase, given a log data item Mj collected in time period tj; $1 \_j\_L$, the signer computes n MAC tags with n these distinct symmetric keys, and then forms a WIT on top of these authentication tags obtaining The signer then compresses the current WIT root σj with the previous ones. At every new time period tj, the signer evolves private keys with a hash function, and deletes the previous keys and authentication tags. These strategies provide forward-security (compromise-resiliency), compactness and all-or-nothing properties at the signer. At the verifiers side, given a data item Mj signed in a time period tj, each verifier computes a MAC with its corresponding private key, and then collaboratively construct a WIT. Each verifier evolves their corresponding private keys and compresses the root of WIT as it was done at the signer side for all time periods and data items to be verified. If all verifiers agree that the final authentication tag is verified, then the signature of all data items are verified.

Table 1 below shows certain cryptography steps that may be used, in whole or in part, to implement CADSA as described and claimed herein. Accordingly, a security system for authenticating the updating of computer records may include, in one embodiment, a network of member computers (101, 102, 103, 104, 105, 106, 150) in data communication with each other, wherein at least a primary computer (125) on the network tracks at least one entry into an audit log stored on the network. A processor (202) is connected to the primary computer (125) and further connected to computerized memory (204) storing software configured to produce an authenticity flag for the at least one entry into the audit log. This occurs in CADSA by distributing, among a group of verifying parties (P1, P2, P3, P4, P5, P6) connected on the network, a plurality of discrete verification tasks for a single authentication code associated with a prospective entry into the audit log, The authenticity flag is a confirmation of authenticity when the single authentication code corresponds to a collective set of verification outputs (V1, V2, V3, V4, V5, V6) from all of the discrete verification tasks. The authenticity flag is a denial of authenticity when any one of the outputs from the discrete verification tasks does not correspond to the single authentication code. In implementing the steps and computations of Table 1, the group of verifying parties comprises a set of "n" verifier parties, each individually assigned to a respective one of "n" member computers on the network, and each member computer of the set of "n" member computers holds a full set of "n" symmetric keys assigned to respective member computers. The software on the primary computer is further configured to use the collective set of outputs from all of the discrete verification tasks to calculate a test code for comparison to the single authentication code for a prospective audit log entry. The "n" symmetric keys are related to a single master secret key by at least one mathematical function. The single master secret key originates from a third-party source other than the member computers and the verifying parties. The symmetric keys each comprise an encoded function of a concatenation of the single master secret key, a respective ID for a respective member computer, a respectively assigned verifier party identification for the member computer, and a time period in which a prospective log entry must have originated. A full set of symmetric keys is transmitted to each member computer, and a respective symmetric key indexed for each member computer is transmitted to a correspondingly indexed verifier party.

In one embodiment, each member computer is configured to operate as a signing computer for a respective audit log entry transmitted to the primary computer from the signing computer, and wherein each member computer operating as a signing computer is furthermore configured to calculate a set of "n" authentication tags for any respectively prospective audit log entry, wherein each authentication tag is computed with a respective symmetric key corresponding to each member computer. Each member computer is configured to operate as a signing computer and calculate the authorization code for the prospective audit log entry using the set of "n" authentication tags and transmits the authorization code to the primary computer with the prospective audit log entry. The primary computer polls each verifier party to individually calculate a corresponding authentication tag using a respective member computer's indexed symmetric key, and upon receiving the corresponding authentication tag from each member computer via all respectively indexed verifier parties, calculating the test value.

The security system disclosed herein includes the primary computer software that compares the test value to the authorization code for setting the authentication flag. Each of the member computers delete a previously used symmetric key, the authorization code, and the authentication tags and calculates a next generation symmetric key for each member computer.

A corresponding method of authenticating a computer data record for saving in a memory on a primary computer is also discernable from Table 1 below. The method includes receiving the computer data record and an authentication code at the primary computer from a signing computer. The primary computer receives a verifying output from a plurality of verifying computers assigned respectively distinct verifying tasks related to the authentication code, calculates a test code from the verifying outputs, and compares the test code and the authentication code. The primary computer is configured to determine that the authentication code from the signing computer corresponds to the test code generated from all of the verification outputs. Upon authentication, the method includes having the computer data record saved at the primary computer. The computer data record may be a prospective audit log record transmitted by the signing computer to the primary computer, wherein the primary computer adds the computer data record to an audit log upon determining that the authentication code corresponds to the test code.

The method includes using verifying computers that correspond to member computers connected as a set on a portion of a communications network, wherein each member computer has a respectively assigned verifying computer. A key generating computer transmits a master secret key to the member computers and each member computer generates a group of symmetric keys indexed to every member of the set of member computers. The method incorporates a respective symmetric key indexed for each member computer is transmitted to a correspondingly indexed verifier party.

Continuing with Table 1, the verifying task assigned to each indexed verifying computer creates a verifying output with a respectively indexed symmetric key, and the primary computer polls each verifying computer to individually calculate a corresponding authentication tag using a respective member computer's indexed symmetric key. Upon receiving the corresponding authentication tag from each member computer via all respectively indexed verifier parties, the primary computer calculates the test value. A method as described herein includes a step wherein the primary computer software compares the test value to the authorization code for accepting or rejecting the computer data record, such as an audit log entry received from any member computer on the network.

Each of the member computers delete a previously used symmetric key, the authorization code, and the authentication tags and calculates a next generation symmetric key for each member computer.

The method may be implemented as a computer program product including computer readable software instructions configured to implement a computerized method at a primary computer. The computerized software method includes calculating a test code from discrete verifying outputs received from a plurality of verifying computers and comparing the test code to an authentication code received with a prospective audit log entry from a signing computer in communication with member computers that correspond to respective ones of the verifying computers.

TABLE 1

COMPUTERIZED STEPS TO IMPLEMENT SYSTEM ($<$ID, $sk^1>$, $<P_1, \ldots, P_n>$) ← CADSA.Kg($1^k$): Executed by a Key Generation Center (KGC) offline at the initialization.

1. KGC generates a master secret msk ← $\{0, 1\}^k$ and sets time periods as T: ($t_1, \ldots t_L$), where L > 1 is an integer. Only the authentication tags generated during T will be considered as valid.
2. Let the identity of signer ID, and verifier parties are ($P_1, \ldots P_n$) where n > 1 is a small constant integer.
3. $k_i^1$ ← H(msk $\|$ ID $\|$ $P_i$ $\|$ T), i = 1, . . . , n.
4. $sk^1 = (k_1^1, \ldots k_n^1)$ is given to the signer ID, and each key $k_i^1$ is given to verifier party $P_i$ for i = 1, . . . n. Note that verifier parties will communicate over a secure channel with each other (e.g., via SSL/TLS).

$\sigma_{1,J}$, $sk^{J+1}$) ← CADSA.LogGen($\sigma_{1,J-1}$, MJ, $sk^J$, $t_J$): Let the authentication tag of ID on messages ($M_1, \ldots, M_{J-1}$) collected and signed during time periods $t_1, \ldots t_{J-1}$ be $\sigma_{1,J-1}$. We compute $\sigma_{1,J}$ for $t_J$ on ($M_1, \ldots MJ$) as follows:

5. $s_i^J$ ← MAC $k_i^J$ ($M_J$), i = 1, . . . n.
6. $\sigma_J$ ← MHT ($s_1^J, \ldots s_n^J$).
7. $\sigma_{1,J}$ ← H ($\sigma_{1,J-1} \| \sigma_J$), where $\sigma_{1,1} = \sigma_1$.
8. $k_i^{J+1}$ ← H ($k_i^J$), i = 1, . . . n, set $sk^{J+1} = (k_1^{J+1}, \ldots k_n^{J+1})$.
9. Delete ($sk^J$, $\sigma_{1,J-1}$, $s_1^J, \ldots s_n^J$) from the memory.

$\{0, 1\}$ ← CADSA.LogVer($<M_1, \ldots M_J>$, $\sigma_{1,J}$, $P_1, \ldots P_n$): The verifier parties execute the following over a secure channel:

10. Each party independently computes $s_i^1$ ← MAC $k_i^1$ ($M_l$), i = 1, . . . n and l = 1, . . . J.
11. Parties collaboratively construct $\sigma'_l$ ← MHT ($s_1^l, \ldots s_n^l$) and $\sigma'_{l,1}$ = H ($\sigma'_{l-1} \| \sigma'_l$), l = 1, . . . , J, where $\sigma'_{l,1}$ = $\sigma'_1$.
12. If all parties agree that $\sigma_{1,J} = \sigma'_{1,J}$ then return 1, else return 0.

Upon a signing computer sending a prospective authentication code and a prospective audit log entry to the primary computer, the remaining verifiers cannot forge a valid authentication tag by themselves. This enables a distributed (conditional) nonrepudiation and a compromise-resiliency for log verification. That is, in order to produce a forged authentication tag on a data item, an active adversary must breach-in all verification parties. On the other hand, one assumes that the verifiers follow protocol correctly, meaning no verifier introduces a malicious or no input. If any of the parties does either of these malicious acts, the verification fails. However, the verification party(ies) introducing no input or malicious input can later be detected and traced down. Hence, assume verifiers are honest-but-curious, who may intent to derive an authentication tag or learn the information about log entries.

One may observe that CADSA is a special case of generic secure multi-party computation with symmetric cryptography. CADSA is specifically designed for secure audit logging wherein forward security, all-or-nothing and distributed verification with all verifiers are achieved, by assuming verifiers are honest-but-curious.

Compromise-Resilient Confidentiality. It is easy to add confidentiality to CADSA. Consider three potential approaches to achieve a compromise-resilient confidentiality for CADSA.

Approach 1: One can consider a use-case, the confidential logs are intended for a particular receiver. In this case, assume the data receiver and the logger share symmetric key K1, the logger can simply encrypt data items collected in time tj with a symmetric cipher, and then evolve the key as Kj+1 from Kj and delete Kj at the end of tj (1≤j≤L. The receiver can follow the same procedure to decrypt the data items. Note that, unlike authentication and integrity that require non-repudiation, this confidentiality service intends a case where only the receiver should possess the private key.

Approach 2: Another alternative is to use a secret sharing scheme like Shamir Secret Sharing (SSS) [29]. Basically, any data item collected in time tj, the logger n-out-a secret shares it among n parties, and delete its shares from its memory. For example, given n=5 verifier parties, only a=4 of them collectively can recover the data secret shared items. This allows a fault-tolerant and distributed storage of log data with an improved resiliency. Note that in this scenario, after the verifier parties recover the data, they can share it with any user of choice (e.g., an auditor).

Approach 3: Consider an application, in which log items are encrypted for an intended receiver as in Approach 1, but this disclosure also requires that they are stored in a distributed manner and the access of intended receiver to log items are regulated by the verifier parties. This approach is useful to enforce a regulated access control on log entries, in which only with the approval of the majority of the verifier parties, the intended receiver can recover log entries. However, this disclosure also requires a strict confidentiality that only the intended receiver can decrypt the log data items after their recovery.

The above goals can be achieved by integrating the first and second approaches. In this use-case, the logger and the intended receiver shares the symmetric key K1 as in the first approach. The logger then encrypts log entries by evolving Kj (j=1, . . . L) as in
Approach 1, and then secret shares those encrypted data items with n parties as in Approach 2. Only n-out-of-a parties can collectively recover the log data items, which can only be decrypted by the intended recipient. This permits a regulation on the access of log data for the intended recipient, wherein n-out-of-a verifier parties should recover the encrypted data first. At the same time, these parties cannot decrypt the log data, since it is forward-secure symmetric encrypted by the logger, wherein the secret key K1 is only known by the intended recipient.

Enhancement with Secure Hardware for Verifier Parties. CADSA may be augmented with highly available secure hardware components such as Secure Guard Extension (SGX) [16, 24]. Specifically, enhancing the collusion resiliency of CADSA is possible by placing each verifier logic into a secure enclave) [24]. So, as long as the secure hardware remains unbreached, the verifiers cannot collude and/or inject malicious inputs to CADSA verification process. At the same time, if the secure hardware is breached (e.g., several practical attacks have been shown to secure hardware [8, 9, 18, 19]), then CADSA still provides all-or-nothing security as originally described, wherein only one honest verifier is sufficient to prevent a forged authentication tag. Therefore, at one hand, this document improved the collusion resiliency of CADSA as long as the secure hardware is intact, and on the other hand, ensured distributed security against a possible breach in secure hardware. Clearly, this approach is superior to stand-alone use of secure hardware for audit logging, or stand-alone use of CADSA without extra hardware protection.

Note that in one embodiment the signer devices are low-end devices (e.g., low-end sensor, embedded devices), and therefore such a secure hardware might not be feasible for the logger. However, the log verifiers in our use-cases are typically traditional cloud/server machines, which can be readily found to be equipped with SGX. Further remark that, these examples just exemplify our solution with SGX, but any other secure hardware is equally applicable, so our solution is not limited to SGX (e.g., [14]).

Figure 2:
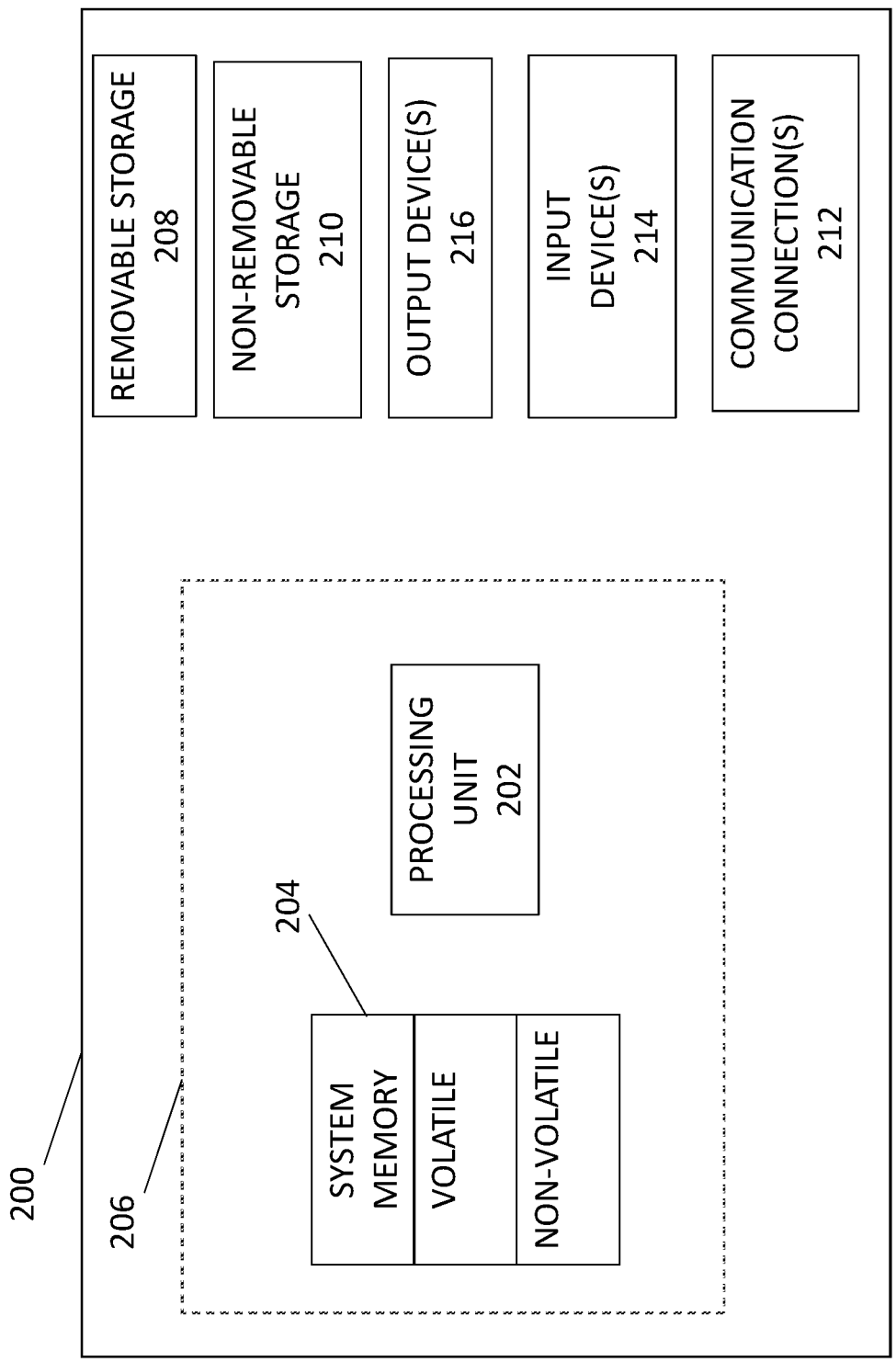
FIG. 2 is a schematic representation of any one of the primary computer, member computers, or verifier party computers as disclosed herein.

FIG. 2 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 2, an exemplary system for implementing aspects described herein includes a computing device, such as computing device 200. In its most basic configuration, computing device 200 typically includes at least one processing unit 202 and memory 204. Depending on the exact configuration and type of computing device, memory 204 may be volatile (such as random access memory (RAM)), non-volatile (such as read-only memory (ROM), flash memory, etc.), or some combination of the two. This most basic configuration is illustrated in FIG. 2 by dashed line 206.

Computing device 200 may have additional features/functionality. For example, computing device 200 may include additional storage (removable and/or non-removable) including, but not limited to, magnetic or optical disks or tape. Such additional storage is illustrated in FIG. 2 by removable storage 208 and non-removable storage 210.

Computing device 200 typically includes a variety of computer readable media. Computer readable media can be any available media that can be accessed by the device 200 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 204, removable storage 208, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 200. Any such computer storage media may be part of computing device 200.

Computing device 200 may contain communication connection(s) 612 that allow the device to communicate with other devices. Computing device 200 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

REFERENCES

[1] Post-quantum cryptography standardization conference, 2018.

[2] M. Abdalla and L. Reyzin. A new forward-secure digital signature scheme. In Advances in Crpytology (ASIACRYPT '00), pages 116-129. Springer-Verlag, 2000.

[3] R. Accorsi. Log data as digital evidence: What secure logging protocols have to offer? In International Computer Software and Applications Conference (COMPSAC '09), pages 398-403, 2009.

[4] M. Bellare and P. Rogaway. Introduction to modern cryptography. In UCSD CSE Course, page 207. 1st edition, 2005. http://www.cs.ucsd.edu/~mihir/cse207/class-notes.html.

[5] Piotr Berman, Marek Karpinski, and Yakov Nekrich. Optimal trade-o_for merkle tree traversal. Theoretical Competitor Science, 372(1):26-36, March 2007.

[6] Daniel J. Bernstein, Daira Hopwood, Andreas Hülsing, Tanja Lange, Ruben Niederhagen, Louiza Papachristodoulou, Michael Schneider, Peter Schwabe, and Zooko Wilcox-O'Hearn. Sphincs: Practical stateless hash-based signatures. In Elisabeth Oswald and Marc Fischlin, editors, Advances in Cryptology—EUROCRYPT 2015, pages 368-397. Springer Berlin Heidelberg, 2015.

[7] Dan Boneh, Ben Lynn, and Hovav Shacham. Short signatures from the weil pairing. In Colin Boyd, editor, Advances in Cryptology—ASIACRYPT 2001, pages 514-532. Springer Berlin Heidelberg, 2001.

[8] Ferdinand Brasser, Urs Müller, Alexandra Dmitrienko, Kari Kostiainen, Srdjan Capkun, and Ahmad-Reza Sadeghi. Software Grand Exposure: SGX Cache Attacks Are Practical.

[9] Jo Van Bulck, Nico Weichbrodt, R. Kapitza, Frank Piessens, and Raoul Strackx. Telling Your Secrets without Page Faults: Stealthy Page Table-Based Attacks on Enclaved Execution. In USENIX Security, 2017.

[10] C. N. Chong and Z. Peng. Secure audit logging with tamper-resistant hardware. In Proceedings of the 18th IFIP International Information Security Conference, pages 73-84. Kluwer Academic Publishers, 2003.

[11] E. Cronin, S. Jamin, T. Malkin, and P. McDaniel. On the performance, feasibility, and use of forward-secure signatures. In Proceedings of the 10th ACM Conference on Computer and Communications Security (CCS '03), pages 131-144. ACM, 2003.

[12] S. Crosby and D. S. Wallach. Efficient data structures for tamper evident logging. In Proceedings of the 18th conference on USENIX Security Symposium, August 2009.

[13] D. Davis, F. Monrose, and M. Reiter. Time-scoped searching of encrypted audit logs. In Proc. of the 6th International Conference on Information and Communications Security (ICICS '04), pages 532-545,2004.

[14] Christopher W Fletcher, Marten van Dijk, and Srinivas Devadas. A secure processor architecture for encrypted computation on untrusted programs. In Proceedings of the seventh ACM workshop on Scalable trusted computing, pages 3-8. ACM, 2012.

[15] J. E. Holt. Logcrypt: Forward security and public verification for secure audit logs. In Proc. of the 4th Australasian workshops on Grid computing and e-research (ACSW '06), pages 203-211, 2006.

[16] Intel Corporation. Intel Software Guard Extensions Programming Reference (rev2), October 2014. 329298-002US.

[17] M. Jakobsson. Fractal hash sequence representation and traversal. In Proceedings of the 2002 IEEE International Symposium on Information Theory (ISIT '02), pages 437-444. IEEE, 2002.

[18] Jaehyuk Lee, Jinsoo Jang, Yeongjin Jang, Nohyun Kwak, Yeseul Choi, Changho Choi, Taesoo Kim, Marcus Peinado, and Brent B Kang. Hacking in darkness: Return-oriented programming against secure enclaves. In USENIX Security, pages 523-539, 2017.

[19] Sangho Lee, Ming-Wei Shih, Prasun Gera, Taesoo Kim, Hyesoon Kim, and Marcus Peinado. Inferring Fine-grained Control Flow Inside SGX Enclaves with Branch Shadowing. In USENIX Security, 2017.

[20] D. Ma. Practical forward secure sequential aggregate signatures. In Proceedings of the 3rd ACM symposium on Information, Computer and Communications Security (ASIACCS '08), pages 341-352, NY, USA, 2008. ACM.

[21] D. Ma and G. Tsudik. Forward-secure sequential aggregate authentication. In Proceedings of the 28th IEEE Symposium on Security and Privacy (S&P '07), pages 86-91, May 2007.

[22] D. Ma and G. Tsudik. A new approach to secure logging. In Proc. of the 22nd Annual IFIP WG 11.3 Working Conference on Data and Applications Security (DBSEC '08), pages 48-63, 2008.

[23] D. Ma and G. Tsudik. A new approach to secure logging. ACM Transaction on Storage (TOS), 5(1):1-21, 2009.

[24] Frank McKeen, Ilya Alexandrovich, Ittai Anati, Dror Caspi, Simon Johnson, Rebekah Leslie-Hurd, and Carlos Rozas. Intel® software guard extensions (Intel® sgx) support for dynamic memory management inside an enclave. In Proceedings of the Hardware and Architectural Support for Security and Privacy 2016, page 10. ACM, 2016.

[25] A. J. Menezes, P. C. van Oorschot, and S. A. Vanstone. Handbook of Applied Cryptography. CRC Press, 1996. ISBN: 0-8493-8523-7.

[26] R. Merkle. Protocols for public key cryptosystems. In Proceedings of the IEEE Symposium on Research in Security and Privacy, April 1980.

[27] B. Schneier and J. Kelsey. Cryptographic support for secure logs on untrusted machines. In Proc. of the 7th conference on USENIX Security Symposium. USENIX Association, 1998.

[28] B. Schneier and J. Kelsey. Secure audit logs to support computer forensics. ACM Transaction on Information System Security, 2(2):159-176, 1999.

[29] A. Shamir. How to share a secret. Communications of the ACM, 22(11):612-613, 1979.

[30] D. Stinson. Cryptography: Theory and Practice, Second Edition. CRC/C&H, 2002.

[31] Michael Szydlo. Merkle tree traversal in log space and time. In EUROCRYPT, pages 541-554, 2004.

[32] A. A. Yavuz and P. Ning. BAF: An efficient publicly verifiable secure audit logging scheme for distributed systems. In Proceedings of 25th Annual Computer Security Applications Conference (ACSAC '09), pages 219-228, 2009.

[33] A. A. Yavuz, Peng Ning, and Michael K. Reiter. BAF and FI-BAF: Efficient and publicly verifiable cryptographic schemes for secure logging in resource constrained systems. ACM Transaction on Information System Security, 15(2), 2012.

It should be understood that while the present disclosure has been provided in detail with respect to certain illustrative and specific aspects thereof, it should not be considered limited to such, as numerous modifications are possible without departing from the broad spirit and scope of the present disclosure as defined in the appended claims. It is, therefore, intended that the appended claims cover all such equivalent variations as fall within the true spirit and scope of the embodiments claimed herein.

The invention claimed is:

1. A security system for authenticating the updating of computer records, comprising:
   a network of member computers in data communication with each other, wherein at least a primary computer on the network tracks at least one entry into an audit log stored on the network;
   a processor connected to the primary computer and further connected to computerized memory storing software configured to produce an authenticity flag for the at least one entry into the audit log by distributing, among a group of verifying parties connected on the network, a plurality of discrete verification tasks for a single authentication code associated with a prospective entry into the audit log,
   wherein the authenticity flag is a confirmation of authenticity when the single authentication code corresponds to a collective set of outputs from all of the discrete verification tasks; and
   wherein the authenticity flag is a denial of authenticity when any one of the outputs from the discrete verification tasks does not correspond to the single authentication code.

2. A security system according to claim 1, wherein:
   the group of verifying parties comprises a set of "n" verifier parties, each individually assigned to a respective one of "n" member computers on the network, and
   each member computer of the set of "n" member computers holds a full set of "n" symmetric keys assigned to respective member computers;
   and the software on the primary computer is further configured to use the collective set of outputs from all of the discrete verification tasks to calculate a test code for comparison to the single authentication code for a prospective audit log entry.

3. A security system according to claim 2, wherein the "n" symmetric keys are related to a single master secret key by at least one mathematical function.

4. A security system according to claim 3, wherein the single master secret key originates from a third-party source other than the member computers and the verifying parties.

5. A security system according to claim 3, wherein the symmetric keys each comprise an encoded function of a concatenation of the single master secret key, a respective ID for a respective member computer, a respectively assigned verifier party identification for the member computer, and a time period in which a prospective log entry must have originated.

6. A security system according to claim 5, wherein a full set of symmetric keys is transmitted to each member computer, and wherein a respective symmetric key indexed for each member computer is transmitted to a correspondingly indexed verifier party.

7. A security system according to claim 6, wherein each member computer is configured to operate as a signing computer for a respective audit log entry transmitted to the primary computer from the signing computer, and wherein each member computer operating as a signing computer is furthermore configured to calculate a set of "n" authentication tags for any respectively prospective audit log entry, wherein each authentication tag is computed with a respective symmetric key corresponding to each member computer.

8. A security system according to claim 7, wherein each member computer is configured to operate as a signing computer and calculate the authorization code for the prospective audit log entry using the set of "n" authentication tags and transmits the authorization code to the primary computer with the prospective audit log entry.

9. A security system according to claim 7, wherein the primary computer polls each verifier party to individually calculate a corresponding authentication tag using a respective member computer's indexed symmetric key, and upon receiving the corresponding authentication tag from each member computer via all respectively indexed verifier parties, calculating the test value.

10. A security system according to claim 9, wherein the primary computer software compares the test value to the authorization code for setting the authentication flag.

11. A security system according to claim 10, wherein each of the member computers delete a previously used symmetric key, the authorization code, and the authentication tags and calculates a next generation symmetric key for each member computer.

* * * * *